(12) United States Patent
Simamura

(10) Patent No.: US 6,747,703 B1
(45) Date of Patent: Jun. 8, 2004

(54) DIAPHRAGM DEVICE AND SHUTTER DEVICE FOR CAMERA

(75) Inventor: Takashi Simamura, Itabashi-ku (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/451,092

(22) Filed: Nov. 30, 1999

(30) Foreign Application Priority Data

Dec. 2, 1998 (JP) .......................................... 10-360030
Feb. 3, 1999 (JP) .......................................... 11-026788

(51) Int. Cl.$^7$ ............................ G03B 7/00; G03B 9/02; H04N 5/235; H04N 5/225; G02B 15/14
(52) U.S. Cl. ........................ 348/362; 348/375; 348/374; 396/508; 359/698; 359/699; 359/700
(58) Field of Search ................................. 348/375, 373, 348/362; 396/460, 208, 450, 451, 449, 485, 483, 505, 407, 459, 508; 359/698, 699, 700

(56) References Cited

U.S. PATENT DOCUMENTS

| 3,678,827 | A | * | 7/1972 | Eagle et al. | ................. 396/207 |
| 4,032,935 | A | * | 6/1977 | Lermann et al. | ............. 396/242 |
| 4,320,976 | A | * | 3/1982 | Obertegger | ................. 356/418 |
| 5,099,334 | A | * | 3/1992 | Ogata et al. | ................. 348/362 |
| 5,485,236 | A | * | 1/1996 | Arai et al. | ..................... 396/65 |
| 6,101,333 | A | * | 8/2000 | Bullitt et al. | ................. 396/61 |
| 6,166,765 | A | * | 12/2000 | Toyofuku | ................ 348/220.1 |

FOREIGN PATENT DOCUMENTS

| JP | 7-111616 | 4/1995 | |
| JP | 2622296 | 4/1997 | |
| JP | 11-174523 | * 7/1999 | ............ G03B/9/04 |

OTHER PUBLICATIONS

JP 11–174523 Watabe et al (English translation).*

* cited by examiner

*Primary Examiner*—Ngoc-Yen Vu
*Assistant Examiner*—James Hannett
(74) *Attorney, Agent, or Firm*—Oblon, Spivak, McClelland, Maier & Neustadt, P.C.

(57) ABSTRACT

A diaphragm device for a digital camera having an optical image input system including a photographing element for converting an optical image input by an optical system to electric signals and a signal processor for applying predetermined signal processing to the electric signals obtained by the photographing element. The diaphragm device adjusts an exposure time by controlling incident luminous flux to the photographing element and an electric charge storage time of the photographing element. The diaphragm device includes a diaphragm sheet rotatably arranged around a rotation central shaft which is set in parallel with a photographing optical axis of the optical system. The diaphragm sheet has a plurality of diaphragm apertures having different diameters arranged in a turret shape on a reference circle around the rotation central shaft. The diaphragm device includes a rotary ring arranged rotatably in forward and reverse directions around the photographing optical axis and a click member is retained by the rotary ring rotatably only in one direction so as to rotate the diaphragm sheet in one direction. A rotation driving device drives the rotary ring to rotate, and a positioning mechanism fastens the diaphragm sheet in a position setting a selected diaphragm aperture.

42 Claims, 11 Drawing Sheets

DIAPHRAGM DEVICE AND SHUTTER DEVICE FOR CAMERA

BACKGROUND OF THE INVENTION

1. Field of the Invention

The present invention relates to a diaphragm mechanism and a shutter mechanism for a camera, and more particularly to a diaphragm device and a shutter device for an electronic camera, such as a digital video camera and a digital still camera, which photographs an object by converting an optical image of an object into electric signals using a solid photographing element including a charge coupled device (CCD) or the like.

2. Discussion of the Background

In a video camera for photographing a dynamic image, generally a solid photographing element such as a solid photographing element including a charge coupled device (CCD) is used as a photographing light receiving element. Furthermore in recent years, digital still cameras have come in widespread use. Such digital still cameras photograph an object image by using a solid photographing element to obtain image data of a still image of the object and record it digitally into an integrated circuit (IC) card or a floppy disk. Among these digital cameras, some are capable of photographing not only a still image but also a dynamic image (a movie image).

As methods of reading out photoelectric-converted pixels in a solid photographing element such as, for example, a CCD solid photographing element, there are a field read-out method and a frame read-out method. For photographing a still image, there are increasing cases of using the frame read-out method which is advantageous in resolution and the like.

In the frame read-out method, an odd number of field transfer read-out operations and an even number of field transfer read-out operations must be performed sequentially. Further, physical light shielding is generally required to the CCD solid photographing element immediately after completion of an appropriate exposure in order to prevent a defective phenomenon such as a smear caused by an exposure during the read-out operation.

In a CCD solid photographing element of a total pixel read-out type, the light shielding after the exposure as described above is not required. However, the above total pixel read-out type CCD solid photographing element is hard to enhance in the number of pixels for manufacturing reasons. Therefore, from the viewpoint of difficulties in manufacturing, an interlace-type CCD solid photographing element is still advantageous though it requires physical light shielding.

The following is general process of photographing a still image with an electronic camera having an electronic finder with a monitor display of a liquid crystal display (LCD) and a zoom lens in which light shielding is performed after completion of an exposure in the frame read-out method.

(1) Turn on the camera.

(2) Set the camera to a photographing (i.e., recording) mode.

(3) Measure luminance of an outside world, particularly that of a field of photographing. Then, a diaphragm is automatically set according to the measured value.

(4) A through image captured by the CCD solid photographing element is displayed, for example on an LCD monitor screen.

(5) Set a zoom position, if necessary.

(6) Determine the composition and depress a release button.

(7) An auto-focus (AF) mechanism is actuated and the photographing lens is moved to a focal position.

(8) An exposure for the CCD solid photographing element is commenced.

(9) The CCD solid photographing element is shielded from the exposure light after an appropriate time period.

(10) The CCD solid photographing element reads out data by an odd number field transfer and by an even number field transfer.

(11) A signal processing device performs display, recording, or other processing appropriately onto image information read out from the CCD solid photographing element.

(12) Start the next photographing operation, or stop the photographing and turn off the camera.

When using a single-focus lens or a fixed-focus lens instead of the zoom lens or in photographing with an electric flash, a process partially different from the above is applied. In every case, however, two different operations, diaphragm setting and light shielding, are required in the photographing process as above, and various improvements have been attempted.

For example, Japanese Patent Publication No. 2622296 discloses accomplishing a diaphragm function and a light shielding function by providing a plurality of diaphragm apertures and a shielding portion adjacent to each of the diaphragm apertures.

Additionally, Japanese Unexamined Patent Publication No. 7-11616 discloses accomplishing a diaphragm function and a light shielding function in almost the same manner as the above Japanese Patent Publication No. 2622296 by providing a turret-type diaphragm sheet having a plurality of diagram apertures and a shielding sheet having a double-sheet configuration arranged separately from the diaphragm sheet with the diaphragm sheet and shielding sheet coupled with each other.

As described above, generally, two separate types of operations, diaphragm setting 5 and light shielding, have been required in a still image photographing process, and therefore, as disclosed in the Japanese Patent Publication No. 2622296 and Japanese Unexamined Patent Publication No. 7-11616, the diaphragm function and the light shielding function are achieved by providing diaphragm apertures and shielding members, each operated independently.

In the Japanese Patent Publication No. 2622296, however, because the exposure and light shielding operations are performed by simply sliding a diaphragm sheet having a plurality of diaphragm apertures, there is a problem that light shielding is performed by a shift of a diaphragm aperture itself having a diaphragm aperture size selected during an exposure. In other words, the exposure operation is generally continued until the diaphragm aperture selected during the exposure is covered behind any end portion of a peripheral portion of an opened diaphragm aperture of the optical system, and therefore an irregular exposure occurs on a surface of the image obtained. In addition, when a moving object is photographed, an unfavorable phenomenon may occur, such as a blurred image, or a deformed object image depending upon a moving direction of the diaphragm aperture and that of the object for photographing even if the camera has a shutter speed (an exposure time between a commencement of the exposure and completion of the light shielding) at which an image can be captured normally.

In addition, because the shielding operation is started from an end of the diaphragm aperture, particularly when a large aperture size is selected, time is consumed from a commencement of light shielding to a completion thereof, which causes the same results as caused by a low shutter speed and a long exposure time, thus causing a problem that blurring easily occurs from an unsteady hold on the camera.

Furthermore, in the Japanese Unexamined Patent Publication No. 7-11616, a shielding sheet having a double-sheet configuration is arranged separately from the turret-type diaphragm sheet. As a result, it is further needed to arrange a coupling member and an energizing spring for opening or closing the shielding sheet, by which the mechanism is complicated.

Still further, because there is no arrangement of a positioning device on the shielding sheet, when the diaphragm aperture is positioned with a stepping motor, due to a step position precision of the stepping motor itself or the like, a diaphragm aperture cannot be set in an accurate position.

Furthermore, when a desired diaphragm aperture size is selected with a turret-type diaphragm sheet, diaphragm apertures having other diaphragm aperture sizes pass the opened diaphragm aperture of the optical system. Therefore, there is a problem that the shielding sheet is opened and closed on all such occasions wastefully, which causes a deterioration of durability of the mechanism or some failure and also generates uncomfortable mechanical sounds when the mechanism is operated.

More recently, there are various improved constitutions in which the shutter is operated after the diaphragm aperture is set by a single motor. However, in such constitutions, because a series of operations is generally treated as a single sequence, it is hard to arbitrarily change the diaphragm aperture after the diaphragm aperture has been once set. Therefore, these constitutions have a tendency to have a disadvantage such as a need for re-executing the sequence from the beginning to change the diaphragm aperture or involving an unnecessary shutter operation.

SUMMARY OF THE INVENTION

The present invention has been made in view of the above-discussed and other problems and addresses the above-discussed and other problems.

Preferred embodiments of the present invention provide a novel diaphragm device in which a reliable diaphragm performance and a high diaphragm precision are achieved and respective functions are performed independently from each other and stably.

Preferred embodiments further provide a novel diaphragm device in which a diaphragm sheet can be small in its external size so as to achieve downsizing of the entire camera and reliable positioning of the diaphragm sheet can be achieved in a simple constitution.

Further, preferred embodiments provide a novel diaphragm device in which a positioning member for positioning a diaphragm sheet is integrated with a position detecting member for detecting a position of the diaphragm sheet so as to detect the position reliably without error in a simple constitution and in which a specific diaphragm aperture position can be detected reliably, very precisely, and durably.

Furthermore, preferred embodiments provide a novel diaphragm device in which a diaphragm sheet can be set reliably in a predetermined position.

Preferred embodiments of the present invention provide a novel shutter device in which an identical rotary ring can be used to control opening or closing of a shutter independently of diaphragm aperture setting and thereby multi-functions, space saving, and low cost are achieved with a small number of members.

Preferred embodiments further provide a novel shutter device in which a high-precision control of the shutter device can be achieved in relation with a diaphragm setting.

Preferred embodiments further provide a novel shutter device in which a series of opening and closing operations of the shutter device can be performed simply with forward and reverse rotation of a rotary ring without a need for a fastening release actuator and the like and which is therefore superior in cost, space, and reliability.

Further, preferred embodiments provide a novel shutter device in which there is no interference between the shutter open-close operation and the diaphragm aperture setting operation and each operation can be adjusted independently.

Furthermore, preferred embodiments provide a novel shutter device that allows photographing repeatedly at a high speed, and that thereby extends the photographing functions.

Furthermore, preferred embodiments provide a novel shutter device in which a light volume is adjustable at monitoring and a degree of freedom is high in a program diagram so as to reduce smear or other defects at high luminance which have been frequently found in background art.

Preferred embodiments further provide a novel shutter device in which regular shutter operations are achieved by reducing contact friction between shutter blades moving in opposite directions and in which a variable diaphragm aperture is achieved with a high exposure precision.

According to a preferred embodiment of the present invention, a digital camera has an optical image input system including a photographing element for converting an optical image input by an optical system to electric signals, a signal processor for applying predetermined signal processing to the electric signals obtained by the photographing element, and a diaphragm device adjusting an exposure time by controlling incident luminous flux to the photographing element and an electric charge storage time of the photographing element. According to the present invention, a novel diaphragm device includes a diaphragm sheet rotatably arranged around a rotation central shaft thereof which is set in parallel with a photographing optical axis of the optical system. The diaphragm sheet has a plurality of diaphragm apertures having different diameters arranged in a turret shape on a reference circle around the rotation central shaft having a radius equal to a distance from the rotation central shaft to the photographing optical axis. The diaphragm device includes a rotary ring arranged rotatably in forward and reverse directions around the photographing optical axis and a click member is retained by the rotary ring rotatably only in one direction so as to rotate the diaphragm sheet in one direction. A rotation driving device drives the rotary ring to rotate, and a positioning mechanism fastens the diaphragm sheet in a position setting a selected diaphragm aperture.

According to the present invention, rotation of the click member in a first direction is regulated by the rotary ring so that a tip of the click member is engaged with a protruding portion of the diaphragm sheet at rotation of the rotary ring in a predetermined direction, and the click member rotates in a second direction different from the first rotation direction while leaving the diaphragm sheet behind in the selected diaphragm aperture setting position at rotation of the rotary ring in a direction reverse to the predetermined direction after completion of setting the selected diaphragm aperture.

According to the present invention, the positioning mechanism may include recess portions formed on an outer periphery of the diaphragm sheet correspondingly to the diaphragm apertures, respectively, and a positioning member energized substantially toward the center of the diaphragm sheet and pushing the recess portion corresponding to the selected diaphragm aperture so that the diaphragm sheet is fastened and positioned in the selected diaphragm aperture setting position.

Further, the positioning member may include a positioning lever rotatable around the rotation central shaft set in parallel with the photographing optical axis. The positioning lever has a first protruding portion having a boss for fastening the diaphragm sheet and extending in a radial direction from a rotation axis of the positioning lever and a second protruding portion extending in a different radial direction for detecting a position of the diaphragm sheet.

According to the present invention, one of the recess portions may have a different shape from those of the other recess portions such that a rotation angle of the positioning lever when the boss of the positioning lever is engaged with the recess portion having the different shape is discriminated from rotation angles of the positioning lever when the boss of the positioning lever is engaged with the other recess portions. As a result, the diaphragm sheet is detected to be in a reference position setting one of the plurality of diaphragm apertures by a moving amount of the second protruding portion of the positioning lever for position detection. An optical sensor may be used for detecting the diaphragm sheet to be in the reference position with the second protruding portion of the positioning lever.

According to the present invention, each of the recess portions of the outer periphery of the diaphragm sheet may have a form such that the boss of the positioning lever drops from an outmost periphery of the diaphragm sheet toward a center thereof immediately before an arbitrary diaphragm aperture reaches the selected diaphragm aperture setting position and prevents rotation of the diaphragm sheet in a direction reverse to the predetermined rotation direction of the diaphragm sheet. Further, each part of the recess portions closest to the center of the diaphragm sheet may be formed so as to be symmetrical about a straight line connecting the center of the diaphragm sheet and that of the boss and to extend in a substantially radial direction from the center of the diaphragm sheet in order to balance a spring force of the boss toward the center of the diaphragm sheet.

Another preferred embodiment of the present invention provides a novel shutter device for a digital camera having an optical image input system including a photographing element for converting an optical image input by an optical system to electric signals and a signal processor for applying predetermined signal processing to the electric signals obtained by the photographing element. The shutter device has a diaphragm function of adjusting an exposure time by controlling incident luminous flux to the photographing element and an electric charge storage time of the photographing element and includes a diaphragm sheet rotatably arranged around a rotation central shaft set in parallel with a photographing optical axis of the optical system. The diaphragm sheet has a plurality of diaphragm apertures having different diameters arranged in a turret shape on a reference circle around the rotation central shaft having a radius equal to a distance from the rotation central shaft to the photographing optical axis. A rotary ring arranged rotatably in forward and reverse directions around the photographing optical axis includes a click member retained by the rotary ring rotatably only in one direction so as to rotate the diaphragm sheet in the one direction. A rotation driving device drives the rotary ring to rotate and a positioning mechanism fastens the diaphragm sheet in a position setting a selected diaphragm aperture. In addition, a shutter mechanism has a shutter blade for light shielding, and the light shielding shutter blade in a closed state is put in a release state in the middle of rotation of the rotary ring from an initial position of the rotary ring in a diaphragm aperture setting direction and, after completion of a diaphragm aperture setting, the light shielding shutter blade is closed in the middle of rotation of the rotary ring in a reverse direction for returning to the initial position.

According to the present invention, the rotary ring may have a member retaining the click member and a member controlling a releasing and closing operation of the shutter blade of the shutter mechanism, which are integrated with the rotary ring, respectively.

Further, the shutter mechanism may have an open-close lever energized so as to drive the shutter blade in a closing direction and a fastening lever energized to fasten the open-close lever in a released state, and a series of operations including pushing the open-close lever with the rotary ring, releasing the shutter blade, dropping the fastening lever, separating the rotary ring from the open-close lever, and fastening the open-close lever with the fastening lever are performed with rotation of the rotary ring from the initial position of the rotary ring. Another series of operations including kicking the fastening lever with the rotary ring, releasing the open-close lever fastened with the fastening lever, and closing the shutter blade by rotation of the open-close lever are performed with rotation of the rotary ring in a direction for returning to the initial position.

According to the present invention, the shutter blade may be released and closed by the shutter mechanism while the rotary ring rotates from the initial position to an intermediary rotated position before a maximally rotated position of the rotary ring and a selected diaphragm aperture may be set while the rotary ring rotates from the intermediary rotated position to the maximally rotated position, such that interference is not caused between operations of releasing and closing the shutter blade and setting the selected diaphragm aperture.

Furthermore, the rotary ring may be driven so as to repeatedly rotate from the initial position to the intermediary rotated position so that the shutter blade is repeatedly released and closed for repeatedly photographing at high speed.

Also, the rotary ring may be driven to rotate from the intermediary rotated position to the maximally rotated position so as to change the selected diaphragm aperture for adjusting a light volume at monitoring.

Further, the shutter mechanism may include two pieces of the shutter blade, and the two shutter blades may be arranged such that the diaphragm sheet is put between the two shutter blades in a direction of the photographing optical axis.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
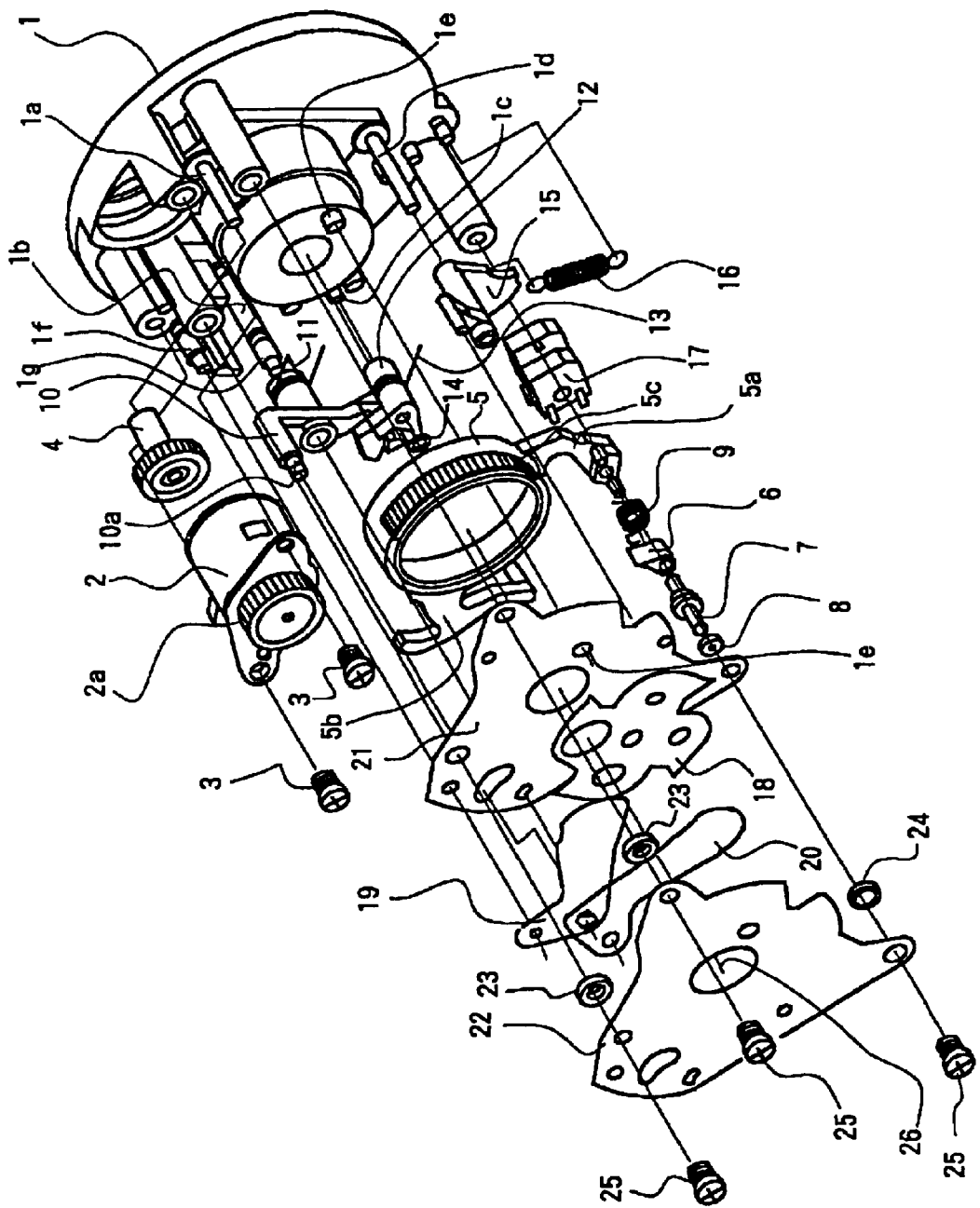
FIG. 1 is an exploded perspective view illustrating a main portion of an electronic camera in which a shutter device according to the present invention is mounted.

Referring now to the drawings, wherein like reference numerals designate identical or corresponding parts throughout the several views, preferred embodiments of the present invention are now described.

FIG. 1 is an exploded perspective view illustrating a main portion of an electronic camera in which a shutter device having a diaphragm function according to the present invention is mounted. FIGS. 2 to 6 illustrate operation conditions of the shutter device for assistance in explaining the operation of the shutter device in FIG. 1. The shutter device illustrated in FIGS. 1 to 6 includes a shutter base 1, a stepping motor 2, a motor setscrew 3, an idler gear 4, a rotary ring 5, a click member 6, a shaft 7, a C-ring 8, an energizing spring 9, an open-close lever 10, a spring 11, a fastening lever 12, a spring 13, a C-ring 14, a positioning lever 15, a spring 16, a photo-interrupter 17, a diaphragm sheet 18, shutter blades 19 and 20, a supporting sheet 21, a press sheet 22, spacers 23 and 24, and a set-screw 25.

The stepping motor 2 is fastened to the shutter base 1 by the motor setscrew 3. The idler gear 4 is mated with a boss 1a formed on the shutter base 1 so as to engage with a pinion gear 2a which is pressed into a shaft of the stepping motor 2.

The rotary ring 5 has an arm 5a extending in a radial direction, and the click member 6 is retained by the arm 5a rotatably with the energizing spring 9, the shaft 7, and the C-ring 8.

The open-close lever 10 is mated with a boss 1b pressed into the shutter base 1 and is energized in a counterclockwise direction by the spring 11. The fastening lever 12 is, in the same manner, mated with a boss 1c pressed into the shutter base 1, energized by the spring 13 in the counterclockwise direction, and fastened by the C-ring 14 for preventing the lever 12 from falling off.

The positioning lever 15 which is a positioning member is, in the same manner, mated with a boss 1d pressed into the shutter base 1 and is energized by the spring 16 in the counterclockwise direction. The photo-interrupter 17 generates ON/OFF signals appropriately according to a rotation amount of the positioning lever 15.

The diaphragm sheet 18 is mated with a boss 1e formed on the shutter base 1 and is rotated in the counterclockwise direction by the click member 6. The shutter blades 19 and 20 are mated with a boss 1f and a boss 1g formed on the shutter base 1, respectively, and are actuated to be opened or closed by a boss 10a at a tip of an arm of the open-close lever 10 extending in one direction.

The supporting sheet 21 receives the diaphragm sheet 18 and the shutter blades 19 and 20 and also serves as a lift preventer for the idler 4, the rotary ring 5, the open-close lever 10, and the positioning lever 15. The press sheet 22 forms a blade chamber for housing the diaphragm sheet 18 and the shutter blades 19 and 20 by inserting the spacers 23 and 24 between the press sheet 22 and the supporting sheet 21. The setscrew 25 is used to fix the blade chamber portion to the shutter base 1. The diaphragm sheet 18 has two or more (four in this embodiment) diaphragm apertures having different diameters (F2, F4, F8, and F 11, for example) in a turret shape on a reference circle around a rotation center of the diagram sheet 18 having a radius equal-to a distance from the rotation center to a photographing optical axis 26. The diaphragm sheet 18 is configured to rotate in a predetermined single direction by using the click member 6.

The click member 6 is retained on the rotary ring 5 which can rotate in forward and reverse directions as described above around the photographing optical axis 26, so that the diaphragm apertures can be sequentially varied by rotating the diaphragm sheet 18 in a single direction with the forward and reverse rotation of the rotary ring 5. Furthermore, a rotary driving force is given by the stepping motor 2 via an idler gear 4 and a pinion gear 2a engaging with a gear portion 5c formed on an outer periphery of the rotary ring 5.

Next, diaphragm setting and shutter operations are described below with reference to front views of related main components illustrated in FIGS. 2 to 6. FIGS. 2, 3, 4, 5, and 6 illustrate an initial condition, a shutter blade setting (charging) condition, an intermediate condition of changing the diaphragm aperture, a condition immediately after the diaphragm aperture is completed to be changed, and an intermediate condition of the rotary ring returning to the initial position with reverse rotation, respectively.

Figure 4:
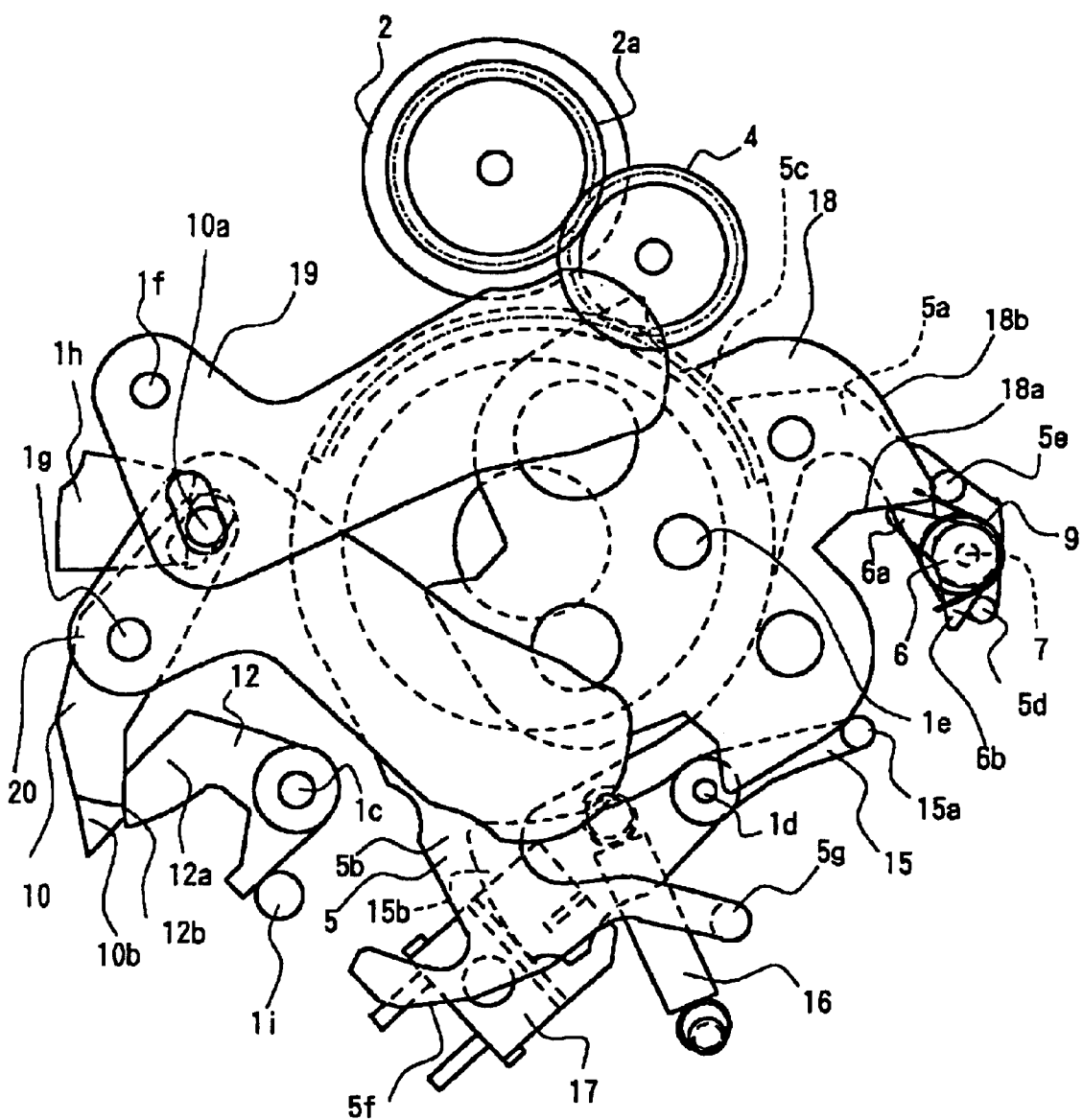

In FIG. 4, one arm 6b of the click member 6 is regulated with respect to rotation in a counterclockwise direction by the boss 5d provided on the rotary ring 5, and therefore in a rotation of the rotary ring 5 in the counterclockwise direction. A tip of another arm 6a of the click member 6 is rotated around the optical axis while pushing straight line portions 18a of four projecting portions of the diaphragm sheet 18. In a condition in FIG. 5, a new diaphragm aperture of the diaphragm sheet 18 is set, and therefore the rotary ring 5 starts reverse rotation from the condition in FIG. 5 to progress to the condition in FIG. 6. At this time, the diaphragm sheet 18 is regulated by the positioning lever 15 with respect to rotation in the clockwise direction. Therefore, a single-direction ratchet mechanism is formed, by which the click member 6 turns around against a spring force of the energizing spring 9 along an outer periphery 18b of the protruding portion of the diaphragm sheet 18 and rotates in the clockwise direction around the optical axis with the diaphragm sheet 18 left behind.

Figure 5:
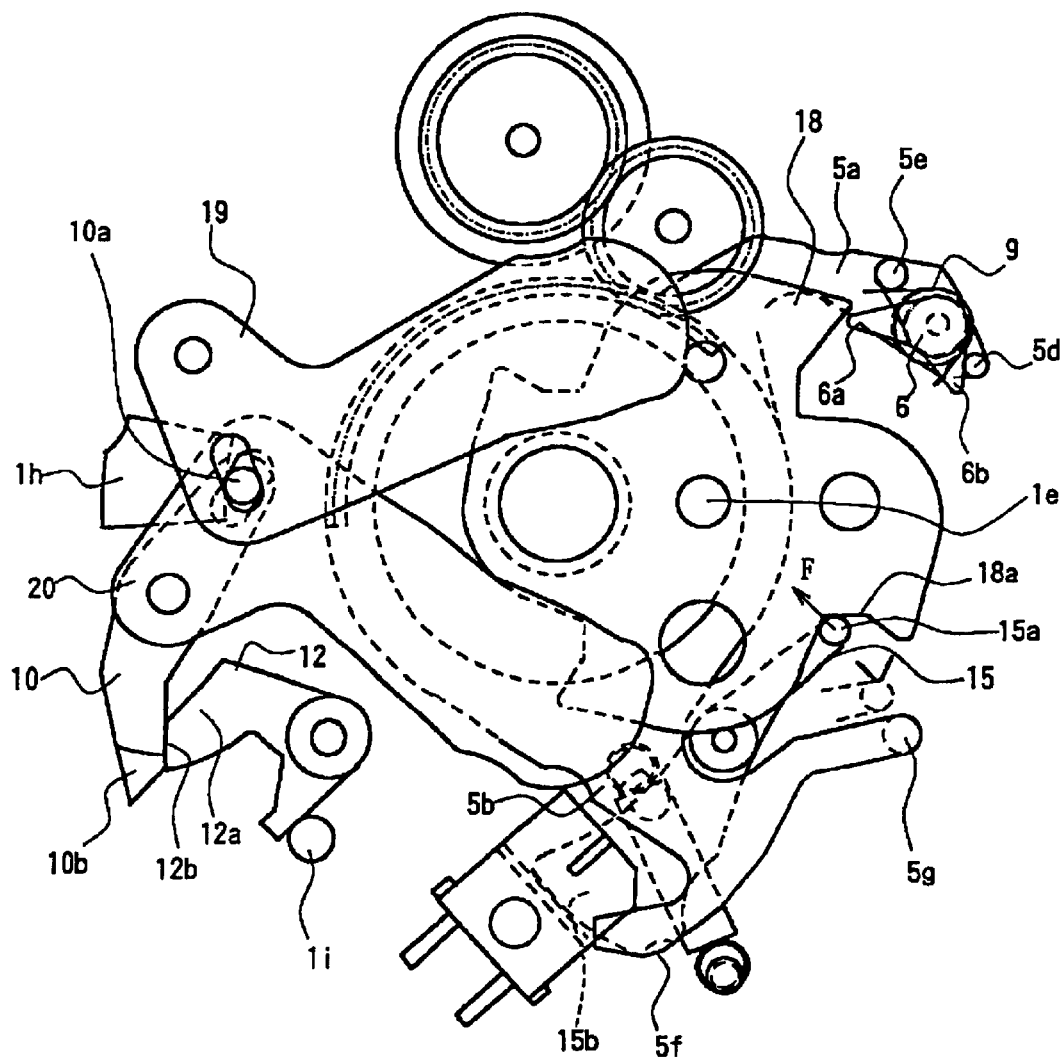
Figure 6:
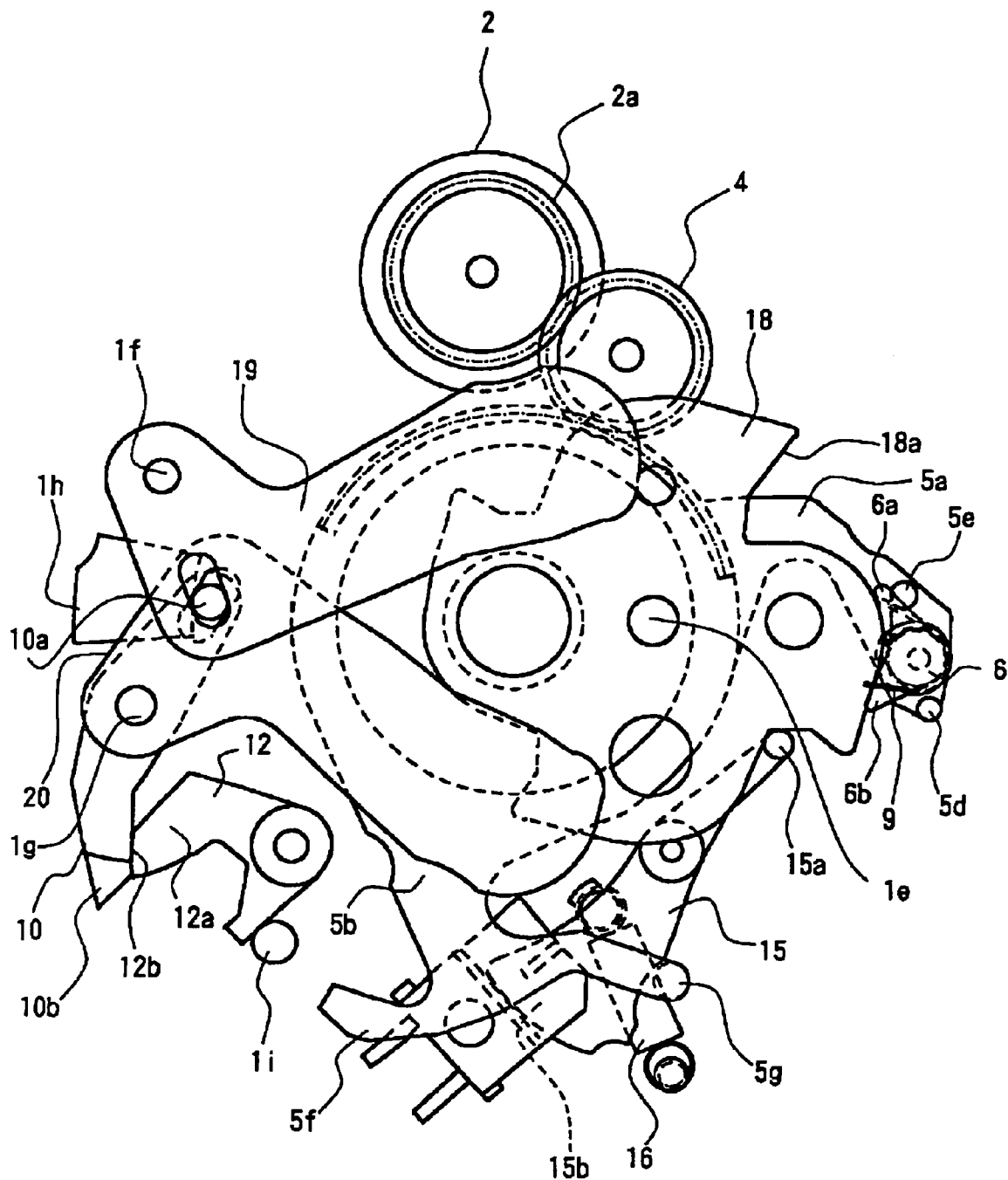

Further, in FIG. 5, a recess portion on the outer periphery of the diagram sheet 18 (formed at four places in this embodiment) is pushed by the boss 15a formed on a first protruding portion of the positioning lever 15 by a force indicated by an arrow F toward the center of the diaphragm sheet 18, and thereby the diaphragm sheet 18 is fastened and positioned.

The positioning lever 15 also has a second protruding portion 15b extending in a different radial direction for detecting the position of the diaphragm sheet 18.

Furthermore, one of the recess portions on the outer periphery of the diaphragm sheet 18 is different from others in shape. When the boss 15a of the positioning lever 15 is engaged with this recess portion by pressing this portion, the position detecting protruding portion 15b rotates by an angle different from angles by which the position detecting protruding portion 15b rotates when the boss 15a of the positioning lever 15 is engaged with the other recess portions, so that a reference position of the diaphragm sheet 18 can be detected.

As a detecting device for the reference position, a photo-interrupter 17, which is an optical sensor, is arranged in a position opposite to the position detecting protruding portion 15b without contacting the protruding portion 15b.

Furthermore, as indicated by dashed lines in FIG. 5, the diaphragm sheet 18 has a form such that the boss 15a of the positioning lever 15 drops from the outer periphery of a protruded portion of the diaphragm sheet 18 toward the center thereof immediately before setting an arbitrary diaphragm aperture and such that after the drop it prevents reverse rotation of the diaphragm sheet 18. The shape of a part of the recess portion closest to the center of the diaphragm sheet 18 is formed so as to be symmetrical about a line between the center of the diaphragm sheet 18 and that of the boss 15a and to extend in a radial direction, and the diaphragm sheet 18 rocks repeatedly with a force of the boss 15a oriented toward the center of the diaphragm sheet 18 and finally settles into a steady state at a position closest to the center of the diaphragm sheet 18.

Next, operations of the shutter blades 19 and 20 will be described below. First, in the initial condition shown in FIG. 2, the fastening lever 12 is pushed up in the clockwise direction by a boss 5g extending to the rear of the rotary ring 5 which is coupled with the stepping motor 2 by a gear via the idler 4.

While the fastening lever 12 is given a spring force in the counterclockwise direction by the spring 13, the rotary ring 5 is held at the initial position, in other words, in a condition that a tip of the rotary ring 5 is in contact with a-stopper boss 1h formed on the shutter base 1 by a detention torque of the stepping motor 2. Therefore, the fastening lever 12 is pushed up against the spring force of the spring 13 so as not to be put into contact with the open-close lever 10.

Figure 2:
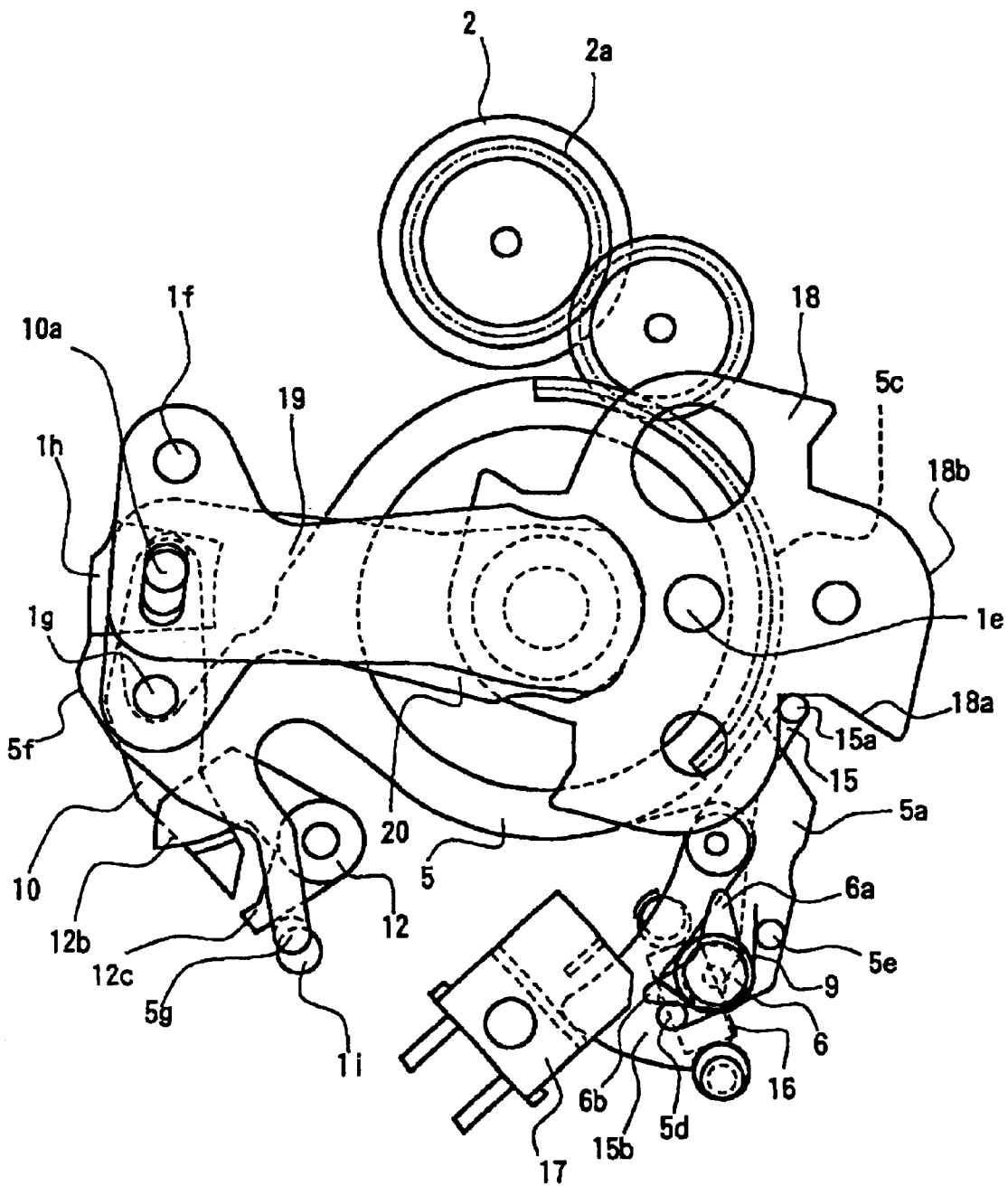
FIGS. 2 through 6 are diagrams illustrating operation conditions of the shutter device for assisting explanation of the operation of the shutter device, FIG. 2 illustrating an initial condition, FIG. 3 a shutter blade setting condition, FIG. 4 an intermediate condition of changing a diaphragm aperture, FIG. 5 a condition immediately after the diaphragm aperture has been changed, and FIG. 6 an intermediate condition of a rotary ring returning to the initial position with reverse rotation.

A stopper 1i illustrated in FIG. 2 regulates the fastening lever 12 not to rotate in the counterclockwise direction when the rotary ring 5 releases the push-up of the fastening lever 12 with rotation in the counterclockwise direction.

Figure 3:
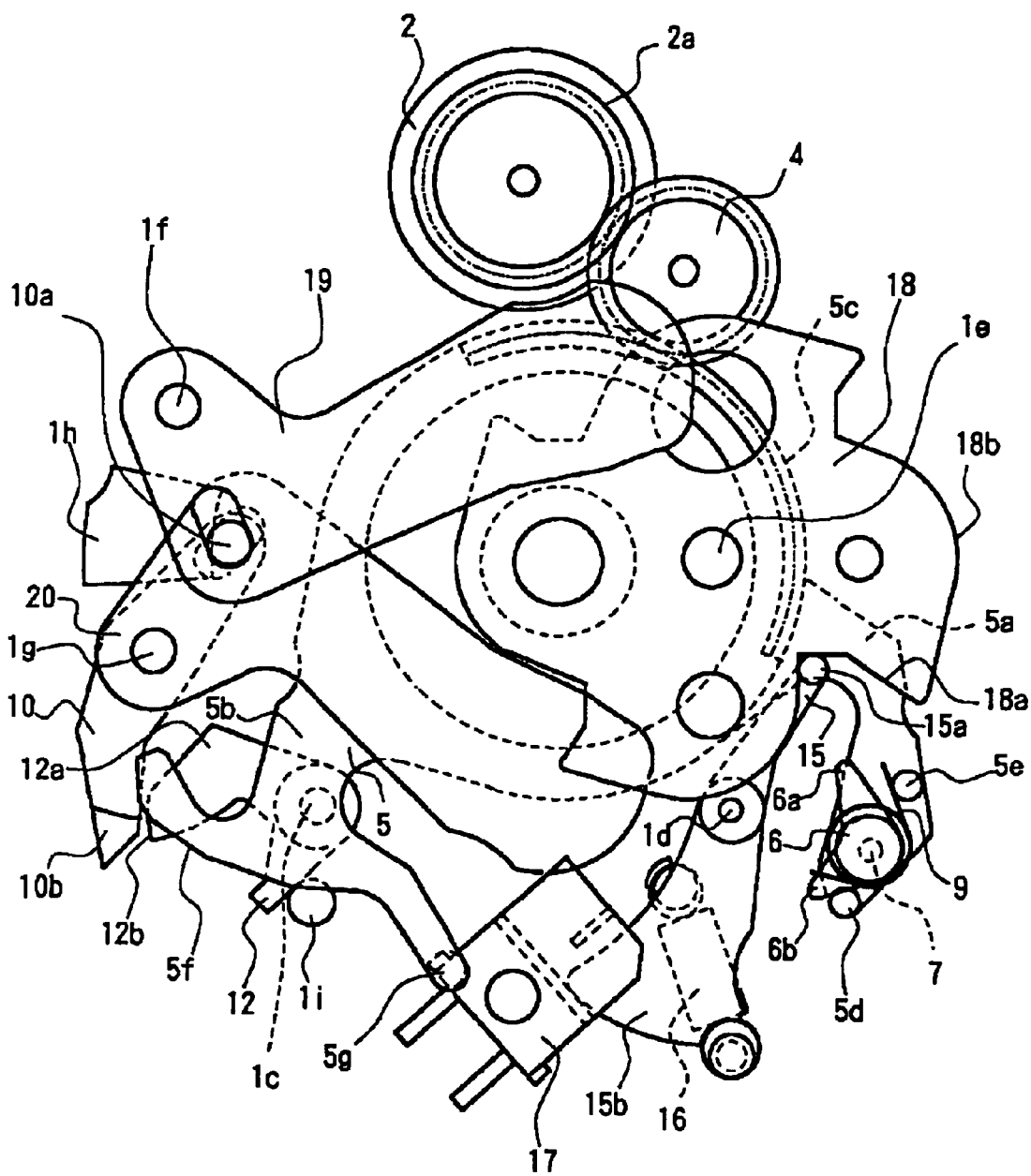

Referring to FIG. 3, there is illustrated a condition where the shutter blades 19 and 20 are set, in other words, a charge condition. With the rotation of the rotary ring 5 in the counterclockwise direction from the initial position, a cam 5f at the tip of a protruding portion 5b of the rotary ring 5 pushes up a tip protruding portion 10b of one arm of the open-close lever 10, so that the open-close lever 10 rotates in the clockwise direction, and thereby the shutter blades 19 and 20 are released. Simultaneously therewith a tip 12b of one protruding portion 12a of the fastening lever 12 enters the inside of the open-close lever 10.

At the condition in FIG. 4, the cam portion 5f of the rotary ring 5 completely separates from the open-close lever 10, and therefore the protruding portion 10b at the tip of the lever 10 is put into contact with the tip 12b of the fastening lever 12 to enter the condition where the shutter blades 19 and 20 are set due to a spring force in the counterclockwise direction given by the spring 11 (FIG. 1).

Thereafter, during the rotation of the rotary ring 5 in the clockwise direction for returning to the initial position, in contrast to the setting process of the shutter blades 19 and 20, when the boss 5g extending to the rear of the rotary ring 5 kicks the tip 12c of the fastening lever 12, the other tip portion 12a releases the open-close lever 10. Therefore, the open-close lever 10 rapidly rotates in the clockwise direction by a force of the spring 11 to close the shutter blades 19 and 20, and the rotary ring 5 returns to the initial position, and thereby photographing is completed for one time.

The rotary ring 5 has a portion retaining the click member 6 for setting the diaphragm aperture and a member for controlling the shutter release and closing operations, which are integrated with the rotary ring 5, respectively.

The releasing and closing operation of the shutter blades 19 and 20 is performed by the operations of the rotary ring 5, the open-close lever 10, and the fastening lever 12. Specifically, the releasing and setting operations of the shutter blades 19 and 20 are performed with counterclockwise rotation of the rotary ring 5 from the initial condition of the rotary ring 5 illustrated in FIG. 2, through the intermediate condition illustrated in FIG. 3, to the setting condition illustrated in FIG. 4, and the closing operation is performed with the rotation of the rotary ring 5 in the direction for returning to the initial position from the condition in FIG. 4 to the condition in FIG. 2. In addition, as apparent from an operation timing chart illustrated in FIG. 7, the rotary ring 5 is configured so as to release or close the shutter blades 19 and 20 while the rotary ring 5 rotates from the initial position (corresponding to the initial position 27 in FIG. 7) to an intermediary rotated position (corresponding to the standby or home position 28 in FIG. 7), and to set a diaphragm aperture while the rotary ring 5 rotates from the intermediary rotated position (the standby or home position 28) to the maximally rotated position (corresponding to the maximally rotated position 29 in FIG. 7), such that no interference is caused between the operations of releasing and closing the shutter blades 19 and 20 and setting a selected diaphragm aperture.

Figure 7:
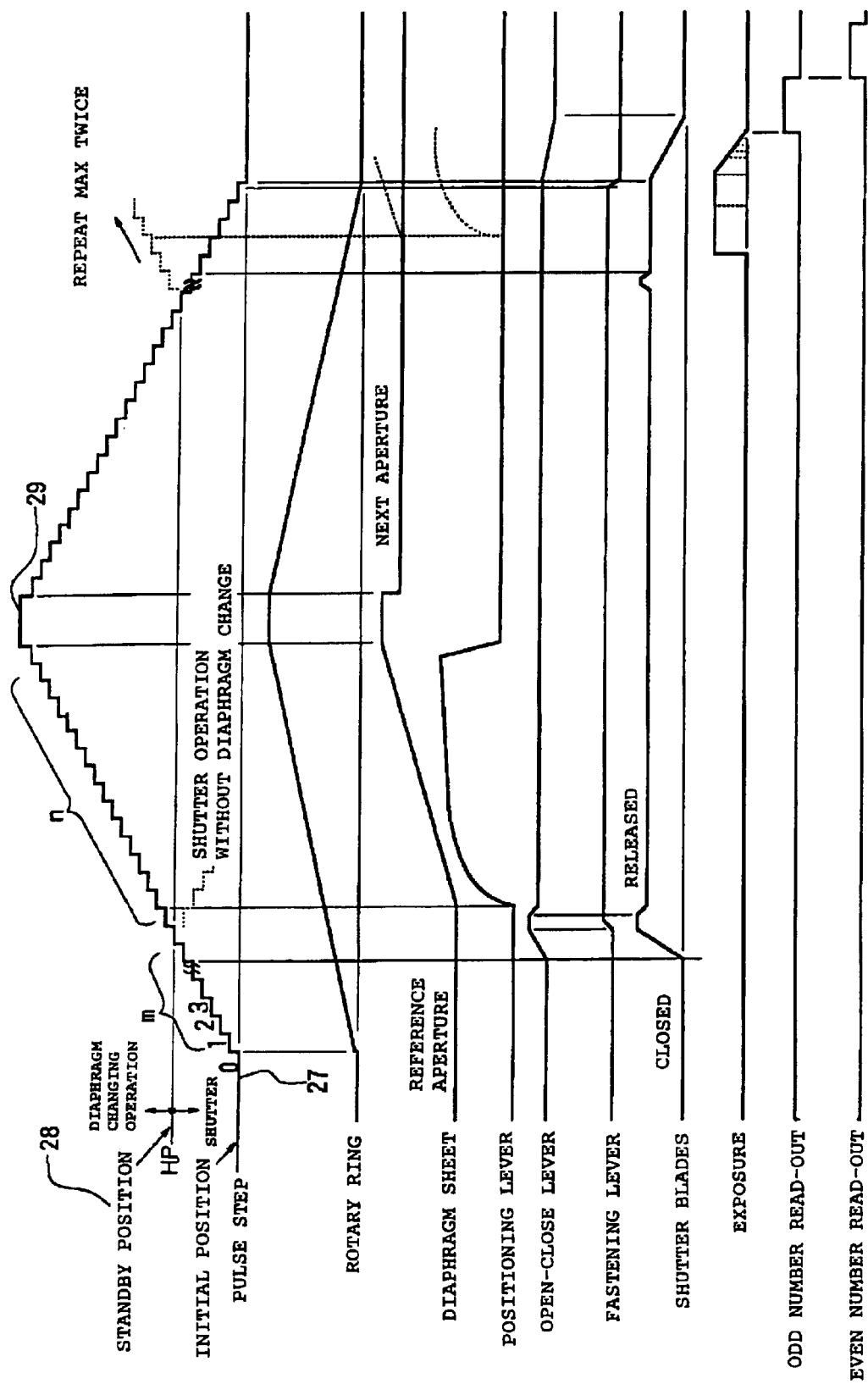
FIG. 7 is a timing chart illustrating operation timings and operation amounts of the rotary ring, the diaphragm sheet, a positioning lever, an open-close lever, a fastening lever and shutter blades, an exposure status, and timings of odd number field read-out and even number field read-out operations in a CCD solid photographing element.

In the operation timing chart in FIG. 7, there are illustrated, accompanied by a pulse step of the stepping motor 2 ("pulse step" in FIG. 7), operation timings and operation amounts of the rotary ring 5, the diaphragm sheet 18, the positioning lever 15, the open-close lever 10, the fastening lever 12, and the shutter blades 19 and 20. Also, an exposure status and timings of odd number field read-out and even number field read-out operations in the CCD solid photographing element are illustrated.

When the rotary ring 5 in the initial position in the power-off condition (corresponding to the initial position 27 in FIG. 7) is driven by the stepping motor 2 and reaches a position immediately before the intermediary rotated position (corresponding to the standby or home position 28), the open-close lever 10 and the shutter blades 19 and 20 are actuated to set the rotary ring 5 in the intermediary rotated position by the fastening lever 12.

If a diaphragm switching operation is performed in this condition, the rotary ring 5 is further driven by the stepping motor 2 so as to actuate the diaphragm sheet 18 and the positioning lever 15, so that the diaphragm sheet 18 is fastened by the positioning lever 15 in the maximally rotated position (corresponding to the maximally rotated position 29), and thereby the subsequent diaphragm aperture is set.

The rotary ring 5 is then driven to rotate in reverse by the stepping motor 2 to return to the intermediary rotated position. The diaphragm aperture can be further changed by repeating the above driving operation of the rotary ring 5 for the forward and reverse rotation by the stepping motor 2. Respective diaphragm apertures of the diaphragm sheet 18 are thus set sequentially.

When the rotary ring 5 is rotated in reverse by the stepping motor 2, while commencing an exposure of the CCD solid photographing element at a timing according to an exposure amount, to a predetermined position from the intermediary rotated position, the fastening lever 12 is actuated to close the shutter blades 19 and 20, and after the blades 19 and 20 are completed to be closed, that is, after the exposure is completed, the odd number field read-out and the even number field read-out operations are performed.

By driving the rotary ring 5 to rotate from the initial position (corresponding to the initial position 27) or the intermediary rotated position (corresponding to the standby or home position 28) to the maximally rotated position (corresponding to the maximally rotated position 29) again, the diaphragm sheet 18 is fastened by the positioning lever 15 in the same manner as above and the next diaphragm aperture is set.

When photographing is continued with the diaphragm aperture which has been set in the intermediary rotated position of the rotary ring 5 after the rotation from the first initial position, the rotary ring 5 is immediately driven to rotate in reverse and an exposure of the CCD solid photographing element is commenced at a timing according to an exposure amount, and thereby the photographing is performed.

Furthermore, the shutter blades 19 and 20 can be released and closed in succession by repeating a reciprocating motion of the rotary ring 5 between the initial position and the intermediary rotated position. Therefore, it is possible to take pictures in succession at high speed.

In addition, a desired diaphragm aperture can be set and be changed to another desired diaphragm aperture by a reciprocating motion of the rotary ring 5 between the intermediary rotated position (the standby or home position 28) and the maximally rotated position (the maximum rotated position 29) once or a plurality of times. Therefore, a light volume can be adjusted, for example, at monitoring without performing any shutter operation.

Figure 8:
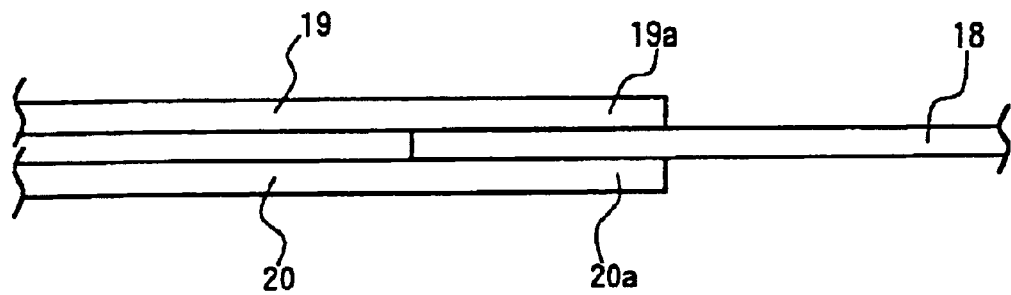
FIG. 8 is a cross-sectional view taken on a line of an optical axis to indicate a positional relationship between the diaphragm sheet and the shutter blades.

Referring to FIG. 8, there is illustrated a cross-sectional view taken on a line of the optical axis 26 to indicate a positional relationship between the diaphragm sheet 18 and the shutter blades 19 and 20. As apparent from FIG. 8, the diaphragm sheet 18 is put in a position between the shutter blade 19 and the shutter blade 20 and is in contact with respective tip portions 19a and 20a of the shutter blades 19 and 20.

Figure 9:
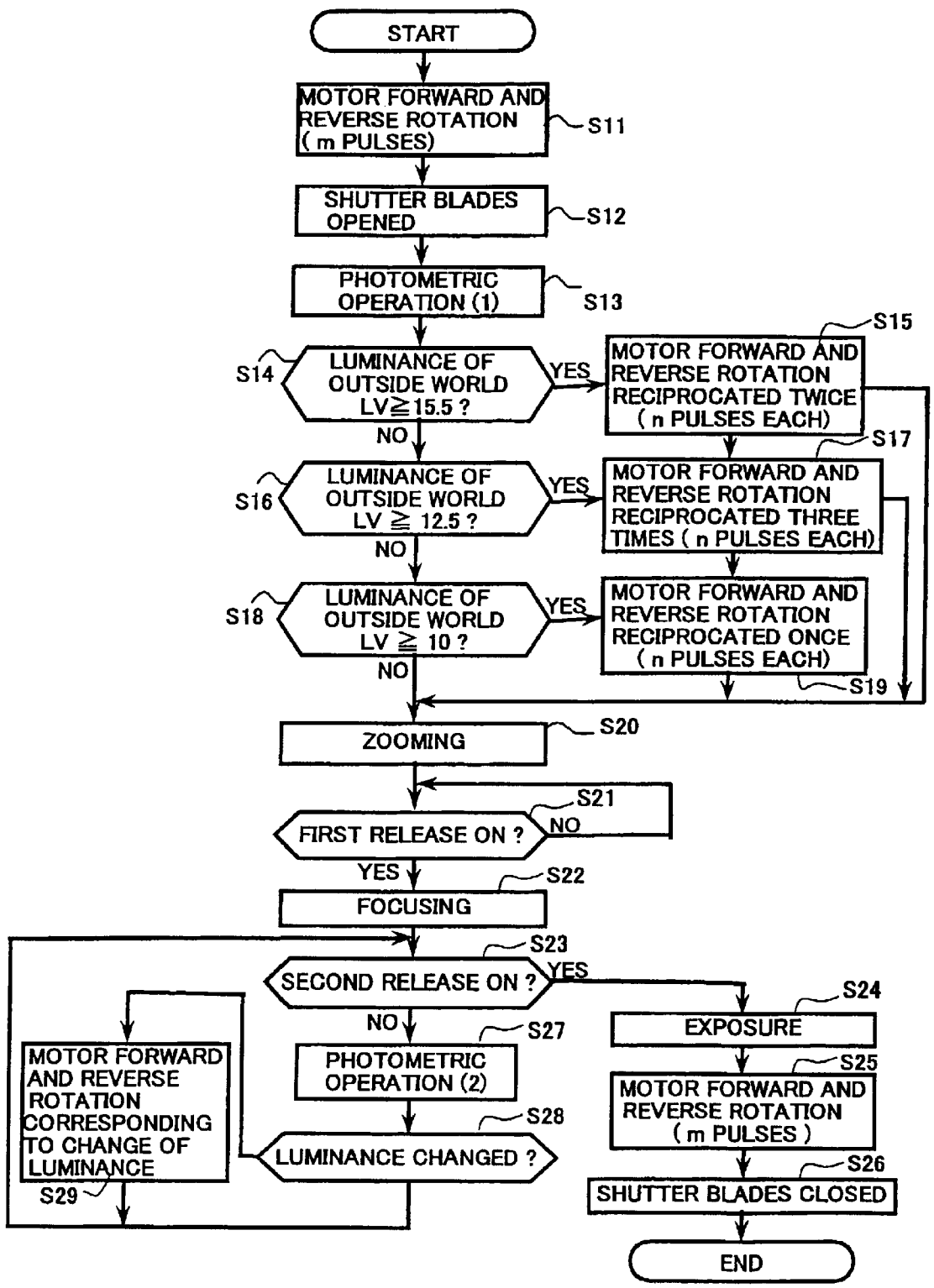
FIG. 9 is a flowchart of an exemplary photographing operation in a normal photographing mode of the electronic camera in which the shutter device according to the present invention is mounted.
Figure 10:
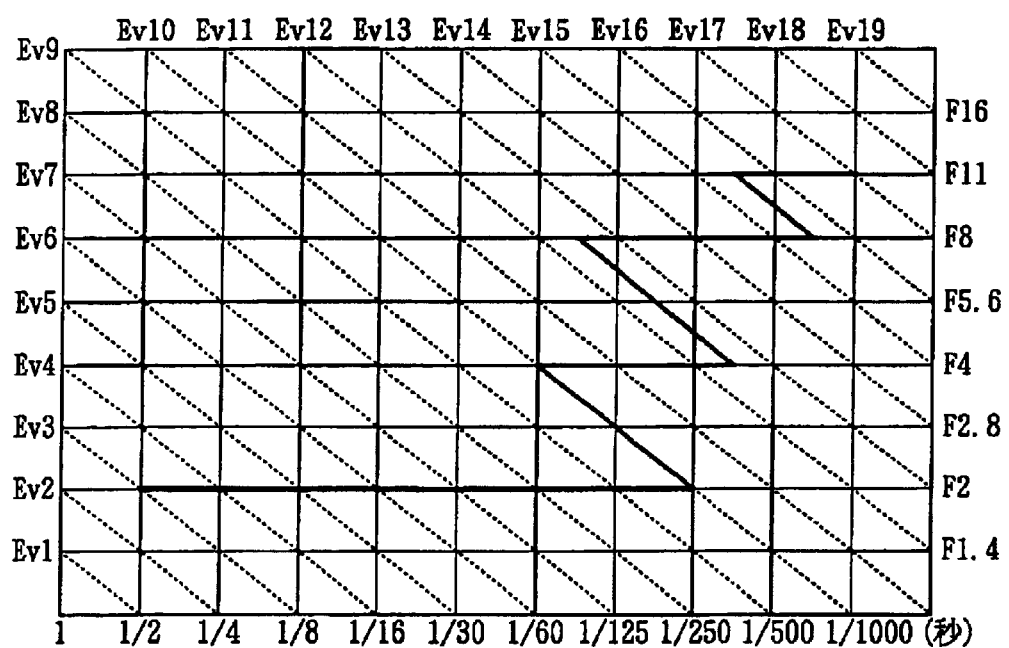
FIG. 10 is a exemplary program diagram for use in controlling a program exposure.
Figure 11:
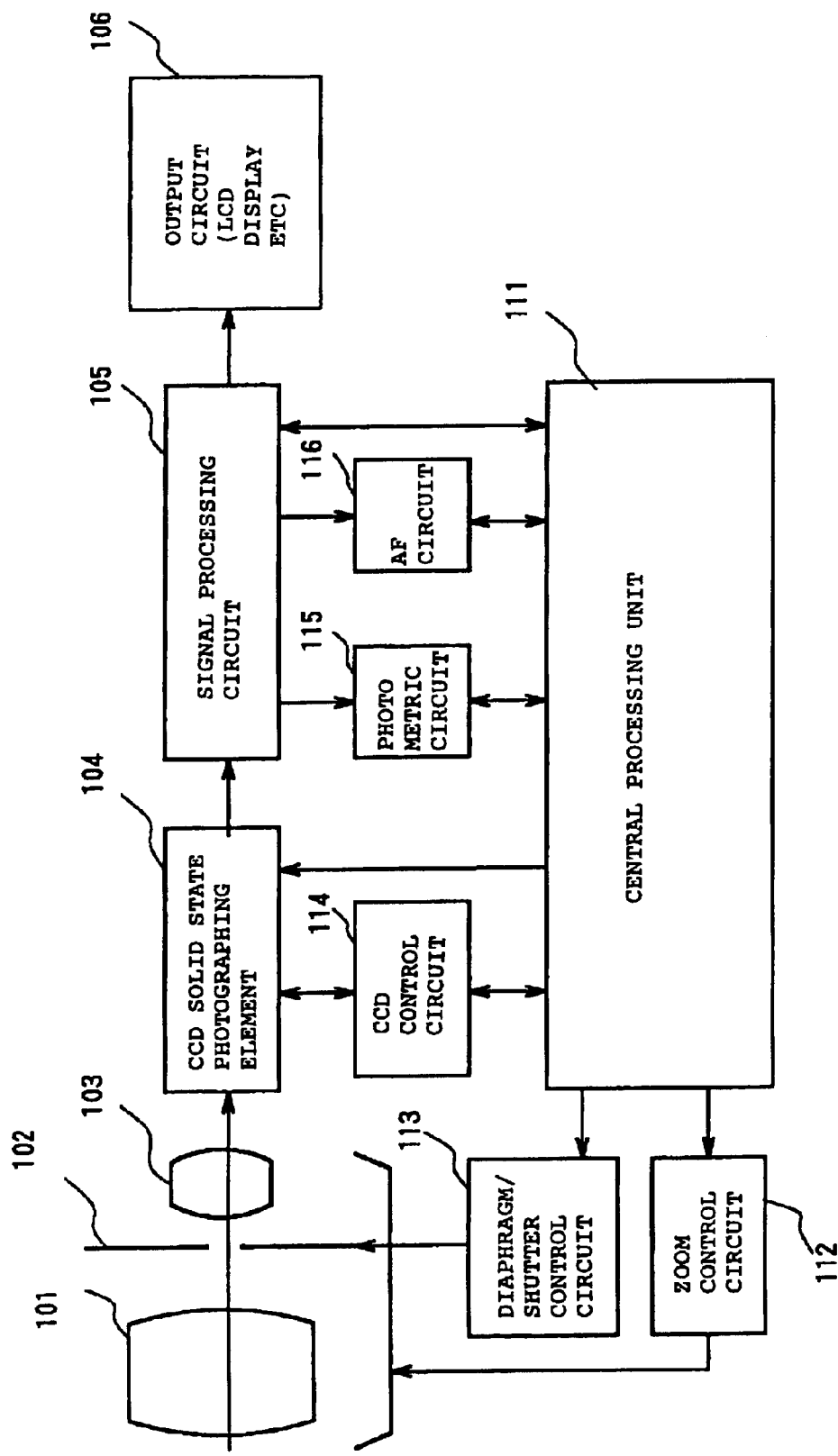
FIG. 11 is an exemplary block diagram of a control part of the camera relating to the program exposure.

FIG. 9 illustrates a flowchart of an exemplary photographing operation in a normal photographing mode of the electronic camera in which the shutter device according to the above embodiment is mounted. FIG. 10 illustrates an exemplary program diagram for use in controlling a program exposure, and FIG. 11 illustrates a block diagram of a control part of the camera relating to the program exposure.

Referring to FIG. 9, when the electronic camera is turned on to start the photographing operation, the stepping motor 2 is rotated in the forward direction by "m" pulses, for example, to drive the rotary ring 5 up to the intermediary rotated position (corresponding to the standby or home position in FIG. 7) in step S11. By this operation, the shutter blades 19 and 20 are released (step S12) to enter the standby condition. In this condition, the first photometric operation is performed (step S13) and a diaphragm value is set on the basis of the program diagram of FIG. 10. An initial diaphragm value of the diaphragm sheet 18, in other words a reference position, is assumed to be set to a second diaphragm aperture corresponding to the focal number F4 from a maximum diaphragm aperture corresponding to the focal number F2 for a condition in which a light value (LV) of a luminance of an outside world (i.e., a field of photographing) is more than 10 and less than 12.5.

Then, whether or not the LV value of the luminance of the outside world (the field of photographing) is greater than a specific value, e.g. 15.5 or greater, is judged (step S14). If the LV value is determined to be 15.5 or greater, Yes in step S14, forward and reverse rotation of the stepping motor 2 each by "n" pulses is repeated twice to set a minimum diaphragm aperture corresponding to a focal number, e.g. F11 (step S15). If the LV value is determined to be less than 15.5 in step S14, then whether or not the LV value is greater than a second value, e.g. 12.5 or greater, is judged (step S16). If the LV value is 12.5 or greater, Yes in step S16, forward and reverse rotation of the stepping motor 2 each by "n" pulses is repeated three times and the diaphragm aperture is set to a second diaphragm aperture from the minimum diaphragm aperture corresponding to a focal number, e.g. F8 (step S17). If the LV value is determined to be less than 12.5 in step S16, then whether or not the LV value is less than a third value, e.g. 10 or smaller, is judged (step S18). If the LV value is 10 or smaller, Yes in step S18, forward and reverse rotation of the stepping motor 2 each by "n" pulses is performed once and the diaphragm aperture is set to the maximum diaphragm aperture corresponding to a focal number, e.g. F2 (step S19).

If the LV value is determined to exceed 10, No in step S18 or after the diaphragm aperture setting has been completed in step S15, S17, or S19, a desired image angle is set by a zooming operation (step S20).

In this condition, the operation awaits for a first stage of a release button to be activated (step S21). If the first stage is activated, the focusing operation is performed (step S22).

Next, the operation awaits for a second stage of the release button to be activated in this condition (step S23). If the second stage is activated, an exposure is commenced (step S24), the stepping motor 2 is driven to rotate in reverse by "m" pulses (step S25), and the shutter blades 19 and 20 are closed (step S26) to complete the photographing operation.

If the second stage of the release button is determined not to be activated in step S23, the photometric operation is performed again (step S27) and it is judged whether or not the luminance is changed (step S28). Unless the luminance is changed, the operation directly returns to step S23 to await the second stage of the release button to be activated. If a luminance change is detected in step S28, the stepping motor 2 is driven for forward and reverse rotation according to a focal number corresponding to a luminance change (step S29), and then the operation returns to step S23 to await the second stage of the release button to be activated.

Referring to FIG. 11, a schematic exemplary block diagram of an electronic camera operating as described above is illustrated. The electronic camera illustrated in FIG. 11 has a lens group 101, a diaphragm/shutter 102, a lens group 103, a CCD solid photographing element 104, a signal processing circuit 105, an output circuit 106, a central processing unit (CPU) 111, a zoom control circuit 112, a diaphragm/shutter control circuit 113, a CCD control circuit 114, a photometric circuit 115, and an auto-focus (AF) circuit 116.

The lens groups 101 and 103 constitute a zoom lens which is a photographing lens. The diaphragm/shutter 102 includes a shutter device according to the embodiment of the present invention. The CCD solid photographing element 104 converts an object image formed by the lens groups 101 and 103 to electric image signals. The signal processing circuit 105 applies predetermined signal processing to image signals output from the CCD solid photographing element 104. The output circuit 106 outputs video signals output from the signal processing circuit 105 for output processing such as displaying to a liquid crystal display (LCD) or recording to a memory card.

The central processing unit 111 controls operations of the electronic camera. The zoom control circuit 112 drives the lens groups 101 and 103 for a zooming operation. The diaphragm/shutter control circuit 113 drives the above stepping motor 2 or the like to control a focal number and a shutter operation of the diaphragm/shutter 102.

The CCD control circuit 114 controls an operation of the CCD solid photographing element 104 to control an exposure and a field read-out operation of image signals. The photometric circuit 115 measures a luminance of the outside world (the field of photographing). The auto-focus circuit 116 measures a distance to the object for focusing by driving at least one of the CCD solid photographing element 104 and the lens groups 101 and 103 via the central processing unit 111.

The central processing unit 111 controls the operations of the CCD solid photographing element 104, the signal processing circuit 105, the zoom control circuit 112, the diaphragm/shutter control circuit 113, the CCD control circuit 114, the photometric circuit 115, and the auto-focus circuit 116.

Numerous additional modifications and variations of the present invention are possible in light of the above teachings. It is therefore to be understood that within the scope of the appended claims, the present invention may be practiced otherwise than specifically described herein.

This document claims priority and contains subject matter related to Japanese patent applications No. 11-026788 and No. 10-360030 filed in the Japanese Patent Office on Feb. 3, 1999, and Dec. 2, 1998, respectively, and the entire contents of which are hereby incorporated herein by reference.

What is claimed is:

1. A diaphragm device for a digital camera having an optical image input system including a photographing element for converting an optical image input by an optical system to electric signals and a signal processor for applying predetermined signal processing to the electric signals obtained by the photographing element, the diaphragm device adjusting an exposure time by controlling incident luminous flux to the photographing element and an electric charge storage time of the photographing element and comprising:

a diaphragm sheet rotatably arranged around a rotation central shaft set in parallel with a photographing optical axis of the optical system and having a plurality of diaphragm apertures having different diameters arranged in a turret shape on a reference circle around the rotation central shaft;

a rotary ring arranged rotatably in forward and reverse directions around the photographing optical axis;

a click member retained by the rotary ring rotatably only in one direction so as to rotate the diaphragm sheet in the one direction;

a rotation driving device driving the rotary ring to rotate; and a positioning mechanism fastening the diaphragm sheet in a position setting a selected diaphragm aperture.

2. A diaphragm device according to claim 1, wherein the rotation driving device comprises a coupled gear group having at least one gear and a motor.

3. A diaphragm device according to claim 1, wherein rotation of the click member in a first rotation direction is regulated by the rotary ring so that a tip of the click member is engaged with a protruding portion of the diaphragm sheet at rotation of the rotary ring in a predetermined direction and the click member rotates in a second rotation direction different from the first rotation direction while leaving the diaphragm sheet behind in the selected diaphragm aperture setting position at rotation of the rotary ring in a direction reverse to the predetermined direction after completion of setting the selected diaphragm aperture.

4. A diaphragm device according to claim 1, wherein the click member comprises a single-direction ratchet mechanism in which rotation of the click member in a first rotation direction is regulated by the rotary ring so that a tip of the click member is engaged with a protruding portion of the diaphragm sheet at rotation of the rotary ring in a predetermined direction and the click member rotates in a second rotation direction different from the first rotation direction along an outer periphery of the diaphragm sheet while leaving the diaphragm sheet behind in the selected diaphragm aperture setting position at rotation of the rotary ring in a direction reverse to the predetermined direction after completion of setting the selected diaphragm aperture in a maximally rotated position of the rotary ring.

5. A diaphragm device according to claim 1, wherein the positioning mechanism comprises:

recess portions formed on an outer periphery of the diaphragm sheet corresponding to respective of the diaphragm apertures; and a positioning member energized substantially toward the center of the diaphragm sheet and pushing the recess portion corresponding to the selected diaphragm aperture so that the diaphragm sheet is fastened and positioned in the selected diaphragm aperture setting position.

6. A diaphragm device according to claim 5, wherein the positioning member comprises a positioning lever rotatable around the rotation central shaft, the positioning lever having a first protruding portion having a boss for fastening the diaphragm sheet and extending in a first radial direction from a rotation axis of the positioning lever and a second protruding portion extending in a second different radial direction for detecting a position of the diaphragm sheet.

7. A diaphragm device according to claim 6, wherein a selected one of the recess portions has a different shape than those of other recess portions such that a rotation angle of the positioning lever when the boss of the positioning lever is engaged with the selected recess portion having the different shape is discriminated from rotation angles of the positioning lever when the boss of the positioning lever is engaged with the other recess portions, so that the diaphragm sheet is detected to be in a reference position setting one of the plurality of diaphragm apertures by a moving amount of the second protruding portion of the positioning lever for position detection.

8. A diaphragm device according to claim 7, further comprising an optical sensor for detecting the diaphragm sheet to be in the reference position with the second protruding portion of the positioning lever.

9. A diaphragm device according to claim 6, wherein each of the recess portions of the outer periphery of the diaphragm sheet has a form such that the boss of the positioning lever drops from an outmost periphery of the diaphragm sheet toward a center thereof immediately before an arbitrary diaphragm aperture reaches the selected diaphragm aperture setting position and prevents rotation of the diaphragm sheet in a direction reverse to the predetermined rotation direction of the diaphragm sheet, and wherein each part of the recess portions closest to the center of the diaphragm sheet is formed so as to be symmetrical about a straight line connecting the center of the diaphragm sheet and that of the boss and to extend in a substantially radial direction from the center of the diaphragm sheet to balance a spring force of the boss toward the center of the diaphragm sheet.

10. A shutter device for a digital camera having an optical image input system including a photographing element for converting an optical image input by an optical system to electric signals and a signal processor for applying predetermined signal processing to the electric signals obtained by the photographing element, the shutter device having a diaphragm function of adjusting an exposure time by controlling incident luminous flux to the photographing element and an electric charge storage time of the photographing element and comprising:
    a diaphragm sheet rotatably arranged around a rotation central shaft set in parallel with a photographing optical axis of the optical system and having a plurality of diaphragm apertures having different diameters arranged in a turret shape on a reference circle around the rotation central shaft;
    a rotary ring arranged rotatably in forward and reverse directions around the photographing optical axis;
    a click member retained by the rotary ring rotatably only in the one direction so as to rotate the diaphragm sheet in the one direction;
    a rotation driving device driving the rotary ring to rotate;
    a positioning mechanism fastening the diaphragm sheet in a position setting a selected diaphragm aperture; and
    a shutter mechanism having a shutter blade for light shielding, in which the light shielding shutter blade in a closed state is put in a release state in a middle of rotation of the rotary ring from an initial position of the rotary ring in a diaphragm aperture setting direction and, after completion of a diaphragm aperture setting, the light shielding shutter blade is closed in the middle of rotation of the rotary ring in a reverse direction for returning to the initial position.

11. A shutter device according to claim 10, wherein the rotation driving device includes a coupled gear group having at least one gear and a motor.

12. A shutter device according to claim 10, wherein the rotary ring has a first member retaining the click member and a second member controlling a releasing and closing operation of the shutter blade of the shutter mechanism, the first and second members being integrated with the rotary ring, respectively.

13. A shutter device according to claim 10, wherein the shutter mechanism has an open-close lever energized so as to drive the shutter blade in a closing direction and a fastening lever energized to fasten the open-close lever in a released state and wherein a series of operations including pushing the open-close lever with the rotary ring, releasing the shutter blade, dropping the fastening lever, separating the rotary ring from the open-close lever, and fastening the open-close lever with the fastening lever are performed with rotation of the rotary ring from the initial position of the rotary ring, and another series of operations including kicking the fastening lever with the rotary ring, releasing the open-close lever fastened with the fastening lever, and closing the shutter blade by rotation of the open-close lever are performed with rotation of the rotary ring in a direction for returning to the initial position.

14. A shutter device according to claim 10, wherein the shutter blade is released and closed by the shutter mechanism while the rotary ring rotates from the initial position to an intermediary rotated position before a maximally rotated position of the rotary ring and a selected diaphragm aperture is set while the rotary ring rotates from the intermediary rotated position to the maximally rotated position, such that interference is not caused between operations of releasing and closing the shutter blade and setting the selected diaphragm aperture.

15. A shutter device according to claim 14, wherein the rotary ring is driven so as to repeatedly rotate from the initial position to the intermediary rotated position so that the shutter blade is repeatedly released and closed for repeatedly photographing at high speed.

16. A shutter device according to claim 14, wherein the rotary ring is driven to rotate from the intermediary rotated position to the maximally rotated position so as to change the selected diaphragm aperture for adjusting a light volume at monitoring.

17. A shutter device according to claim 10, wherein the shutter mechanism includes two shutter blades arranged such that the diaphragm sheet is positioned between the two shutter blades in a direction of the photographing optical axis.

18. A diaphragm device for a digital camera having an optical image input system including a photographing element for converting an optical image input by an optical system to electric signals and a signal processor for applying predetermined signal processing to the electric signals obtained by the photographing element, the diaphragm device adjusting an exposure time by controlling incident luminous flux to the photographing element and an electric charge storage time of the photographing element and comprising:
    a diaphragm sheet rotatably arranged around a rotation central shaft set in parallel with a photographing optical axis of the optical system and having a plurality of diaphragm apertures having different diameters arranged in a turret shape on a reference circle around the rotation central shaft;
    a rotary ring arranged rotatably in forward and reverse directions around the photographing optical axis, the rotary ring including means for rotating the diaphragm sheet in one direction;
    means for driving the rotary ring to rotate; and
    means for fastening the diaphragm sheet in a position setting a selected diaphragm aperture.

19. A diaphragm device according to claim 18, wherein the fastening means comprises:
    recess portions formed on an outer periphery of the diaphragm sheet corresponding to respective of the diaphragm apertures; and
    means for pushing the recess portion corresponding to the selected diaphragm aperture so that the diaphragm sheet is fastened and positioned in the selected diaphragm aperture setting position.

20. A diaphragm device according to claim 19, wherein the positioning means comprises a first means for fastening the diaphragm sheet and a second means for detecting a position of the diaphragm sheet.

21. A shutter device for a digital camera having an optical image input system including a photographing element for converting an optical image input by an optical system to electric signals and a signal processor for applying predetermined signal processing to the electric signals obtained by the photographing element, the shutter device having a diaphragm function of adjusting an exposure time by controlling incident luminous flux to the photographing element and an electric charge storage time of the photographing element and comprising:
- a diaphragm sheet rotatably arranged around a rotation central shaft set in parallel with a photographing optical axis of the optical system and having a plurality of diaphragm apertures having different diameters arranged in a turret shape on a reference circle around the rotation central shaft;
- a rotary ring arranged rotatably in forward and reverse directions around the photographing optical axis, the rotary ring including means for rotating the diaphragm sheet in one direction;
- means for driving the rotary ring to rotate;
- means for fastening the diaphragm sheet in a position setting a selected diaphragm aperture; and
- a shutter mechanism having a shutter blade for light shielding, in which the light shielding shutter blade in a closed state is put in a release state in a middle of rotation of the rotary ring from an initial position of the rotary ring in a diaphragm aperture setting direction and, after completion of a diaphragm aperture setting, the light shielding shutter blade is closed in the middle of rotation of the rotary ring in a reverse direction for returning to the initial position.

22. A camera comprising:
- an optical image input system including a photographing element for converting an optical image input by an optical system to electric signals;
- a signal processor for applying predetermined signal processing to the electric signals obtained by the photographing element; and
- a diaphragm device for adjusting an exposure time by controlling incident luminous flux to the photographing element and an electric charge storage time of the photographing element, the diaphragm device comprising:
  - a diaphragm sheet rotatably arranged around a rotation central shaft thereof set in parallel with a photographing optical axis of the optical system and having a plurality of diaphragm apertures having different diameters arranged in a turret shape on a reference circle around the rotation central shaft;
  - a rotary ring arranged rotatably in forward and reverse directions around the photographing optical axis;
  - a click member retained by the rotary ring rotatably only in one direction so as to rotate the diaphragm sheet in the one direction;
  - a rotation driving device driving the rotary ring to rotate; and
  - a positioning mechanism fastening the diaphragm sheet in a position setting a selected diaphragm aperture.

23. A camera according to claim 22, wherein the rotation driving device comprises a coupled gear group having at least one gear and a motor.

24. A camera according to claim 22, wherein rotation of the click member in a first rotation direction is regulated by the rotary ring so that a tip of the click member is engaged with a protruding portion of the diaphragm sheet at rotation of the rotary ring in a predetermined direction and the click member rotates in a second rotation direction different from the first rotation direction while leaving the diaphragm sheet behind in the selected diaphragm aperture setting position at rotation of the rotary ring in a direction reverse to the predetermined direction after completion of setting the selected diaphragm aperture.

25. A camera according to claim 22, wherein the click member comprises a single-direction ratchet mechanism in which rotation of the click member in a first rotation direction is regulated by the rotary ring so that a tip of the click member is engaged with a protruding portion of the diaphragm sheet at rotation of the rotary ring in a predetermined direction and the click member rotates in a second rotation direction different from the first rotation direction along an outer periphery of the diaphragm sheet while leaving the diaphragm sheet behind in the selected diaphragm aperture setting position at rotation of the rotary ring in a direction reverse to the predetermined direction after completion of setting the selected diaphragm aperture in a maximally rotated position of the rotary ring.

26. A camera according to claim 22, wherein the positioning mechanism comprises:
- recess portions formed on an outer periphery of the diaphragm sheet corresponding to respective of the diaphragm apertures; and
- a positioning member energized substantially toward the center of the diaphragm sheet and pushing the recess portion corresponding to the selected diaphragm aperture so that the diaphragm sheet is fastened and positioned in the selected diaphragm aperture setting position.

27. A camera according to claim 26, wherein the positioning member comprises a positioning lever rotatable around the rotation central shaft, the positioning lever having a first protruding portion having a boss for fastening the diaphragm sheet and extending in a first radial direction from a rotation axis of the positioning lever and a second protruding portion extending in a second different radial direction for detecting a position of the diaphragm sheet.

28. A camera according to claim 27, wherein a selected one of the recess portions has a different shape than those of other recess portions such that a rotation angle of the positioning lever when the boss of the positioning lever is engaged with the selected recess portion having the different shape is discriminated from rotation angles of the positioning lever when the boss of the positioning lever is engaged with the other recess portions, so that the diaphragm sheet is detected to be in a reference position setting one of the plurality of diaphragm apertures by a moving amount of the second protruding portion of the positioning lever for position detection.

29. A camera according to claim 28, further comprising an optical sensor for detecting the diaphragm sheet to be in the reference position with the second protruding portion of the positioning lever.

30. A camera according to claim 27, wherein each of the recess portions of the outer periphery of the diaphragm sheet has a form such that the boss of the positioning lever drops from an outmost periphery of the diaphragm sheet toward a center thereof immediately before an arbitrary diaphragm aperture reaches the selected diaphragm aperture setting position and prevents rotation of the diaphragm sheet in a direction reverse to the predetermined rotation direction of the diaphragm sheet, and wherein each part of the recess portions closest to the center of the diaphragm sheet is formed so as to be symmetrical about a straight line connecting the center of the diaphragm sheet and that of the boss and to extend in a substantially radial direction from the center of the diaphragm sheet in order to balance a spring force of the boss toward the center of the diaphragm sheet.

31. A camera comprising:
- an optical image input system including a photographing element for converting an optical image input by an optical system to electric signals;
- a signal processor for applying predetermined signal processing to the electric signals obtained by the photographing element; and
- a shutter device having a diaphragm function of adjusting an exposure time by controlling incident luminous flux to the photographing element and an electric charge storage time of the photographing element, the shutter device comprising:
    - a diaphragm sheet rotatably arranged around a rotation central shaft set in parallel with a photographing optical axis of the optical system and having a plurality of diaphragm apertures having different diameters arranged in a turret shape on a reference circle around the rotation central shaft;
    - a rotary ring arranged rotatably in forward and reverse directions around the photographing optical axis;
    - a click member retained by the rotary ring rotatably only in one direction so as to rotate the diaphragm sheet in the one direction;
    - a rotation driving device driving the rotary ring to rotate;
    - a positioning mechanism fastening the diaphragm sheet in a position setting a selected diaphragm aperture; and
    - a shutter mechanism having a shutter blade for light shielding, in which the light shielding shutter blade in a closed state is put in a release state in a middle of rotation of the rotary ring from an initial position of the rotary ring in a diaphragm aperture setting direction and, after completion of a diaphragm aperture setting, the light shielding shutter blade is closed in the middle of rotation of the rotary ring in a reverse direction for returning to the initial position.

32. A camera according to claim 31, wherein the rotation driving device includes a coupled gear group having at least one gear and a motor.

33. A camera according to claim 31, wherein the rotary ring has a first member retaining the click member and a second member controlling a releasing and closing operation of the shutter blade of the shutter mechanism, the first and second members being integrated with the rotary ring, respectively.

34. A camera according to claim 31, wherein the shutter mechanism has an open-close lever energized so as to drive the shutter blade in a closing direction and a fastening lever energized to fasten the open-close lever in a released state and wherein a series of operations including pushing the open-close lever with the rotary ring, releasing the shutter blade, dropping the fastening lever, separating the rotary ring from the open-close lever, and fastening the open-close lever with the fastening lever are performed with rotation of the rotary ring from the initial position of the rotary ring, and another series of operations including kicking the fastening lever with the rotary ring, releasing the open-close lever fastened with the fastening lever, and closing the shutter blade by rotation of the open-close lever are performed with rotation of the rotary ring in a direction for returning to the initial position.

35. A camera according to claim 31, wherein the shutter blade is released and closed by the shutter mechanism while the rotary ring rotates from the initial position to an intermediary rotated position before a maximally rotated position of the rotary ring and a selected diaphragm aperture is set while the rotary ring rotates from the intermediary rotated position to the maximally rotated position, such that interference is not caused between operations of releasing and closing the shutter blade and setting the selected diaphragm aperture.

36. A camera according to claim 35, wherein the rotary ring is driven so as to repeatedly rotate from the initial position to the intermediary rotated position so that the shutter blade is repeatedly released and closed for repeatedly photographing at high speed.

37. A camera according to claim 35, wherein the rotary ring is driven to rotate from the intermediary rotated position to the maximally rotated position so as to change the selected diaphragm aperture for adjusting a light volume at monitoring.

38. A camera according to claim 31, wherein the shutter mechanism includes two shutter blades arranged such that the diaphragm sheet is positioned between the two shutter blades in a direction of the photographing optical axis.

39. A diaphragm device for a camera, comprising:
- a diaphragm sheet rotatably arranged around a rotation central shaft set in parallel with a photographing optical axis of the camera and having a plurality of diaphragm apertures having different diameters arranged in a turret shape on a reference circle around the rotation central shaft;
- a rotary ring arranged rotatably in forward and reverse directions around the photographing optical axis, the rotary ring including means for rotating the diaphragm sheet in one direction;
- means for driving the rotary ring to rotate; and
- means for fastening the diaphragm sheet in a position setting a selected diaphragm aperture.

40. A shutter device for a camera, comprising:
- a diaphragm sheet rotatably arranged around a rotation central shaft set in parallel with a photographing optical axis of the camera and having a plurality of diaphragm apertures having different diameters arranged in a turret shape on a reference circle around the rotation central shaft;
- a rotary ring arranged rotatably in forward and reverse directions around the photographing optical axis, the rotary ring including means for rotating the diaphragm sheet in one direction;
- means for driving the rotary ring to rotate;
- means for fastening the diaphragm sheet in a position setting a selected diaphragm aperture; and
- a shutter mechanism having a shutter blade for light shielding, in which the light shielding shutter blade in a closed state is put in a release state in a middle of rotation of the rotary ring from an initial position of the rotary ring in a diaphragm aperture setting direction and, after completion of a diaphragm aperture setting, the light shielding shutter blade is closed in the middle of rotation of the rotary ring in a reverse direction for returning to the initial position.

41. A camera comprising:

a diaphragm device including:

a diaphragm sheet rotatably arranged around a rotation central shaft thereof set in parallel with a photographing optical axis of the camera and having a plurality of diaphragm apertures having different diameters arranged in a turret shape on a reference circle around the rotation central shaft;

a rotary ring arranged rotatably in forward and reverse directions around the photographing optical axis, the rotary ring including means for rotating the diaphragm sheet in one direction;

means for driving the rotary ring to rotate; and means for fastening the diaphragm sheet in a position setting a selected diaphragm aperture.

42. A camera comprising:

a shutter device including:

a diaphragm sheet rotatably arranged around a rotation central shaft set in parallel with a photographing optical axis of the camera and having a plurality of diaphragm apertures having different diameters arranged in a turret shape on a reference circle around the rotation central shaft;

a rotary ring arranged rotatably in forward and reverse directions around the photographing optical axis, the rotary ring including means for rotating the diaphragm sheet in one direction;

means for driving the rotary ring to rotate;

means for fastening the diaphragm sheet in a position setting a selected diaphragm aperture; and a shutter mechanism having a shutter blade for light shielding, in which the light shielding shutter blade in a closed state is put in a release state in a middle of rotation of the rotary ring from an initial position of the rotary ring in a diaphragm aperture setting direction and, after completion of a diaphragm aperture setting, the light shielding shutter blade is closed in the middle of rotation of the rotary ring in a reverse direction for returning to the initial position.

* * * * *